United States Patent [19]

Tsuchitani et al.

[11] Patent Number: 5,756,057

[45] Date of Patent: May 26, 1998

[54] METHOD FOR REMOVAL OF NITROGEN OXIDES FROM EXHAUST GAS

[75] Inventors: Kazuo Tsuchitani; Masao Hori; Satoshi Inui, all of Hyogo, Japan

[73] Assignee: Nippon Shokubai Co., Ltd., Japan

[21] Appl. No.: 780,346

[22] Filed: Jan. 8, 1997

Related U.S. Application Data

[63] Continuation of Ser. No. 234,989, Apr. 28, 1994, abandoned.

[30] Foreign Application Priority Data

Apr. 28, 1993 [JP] Japan ................................ 5-103183
Sep. 10, 1993 [JP] Japan ................................ 5-225983

[51] Int. Cl.$^6$ ........................... B01D 53/94; B01D 53/56
[52] U.S. Cl. ........................... 423/213.2; 423/213.5; 423/213.7; 423/239.1
[58] Field of Search ........................... 423/213.7, 239.2, 423/239.1, 213.5, 213.2

[56] References Cited

U.S. PATENT DOCUMENTS

| | | | |
|---|---|---|---|
| 3,978,193 | 8/1976 | Fedor et al. | 423/213.7 |
| 4,071,600 | 1/1978 | Schlatter et al. | 423/213.7 |
| 4,117,081 | 9/1978 | Inaba et al. | 423/239 |
| 4,297,328 | 10/1981 | Ritscher et al. | 423/213.2 |
| 4,521,530 | 6/1985 | Zackay et al. | 502/218 |
| 4,867,953 | 9/1989 | Riekert et al. | 423/239 |
| 4,904,633 | 2/1990 | Ohata et al. | 502/304 |
| 5,049,364 | 9/1991 | Yoshimoto et al. | 423/239 |
| 5,128,306 | 7/1992 | Dettling et al. | 502/304 |
| 5,208,202 | 5/1993 | Muramatsu et al. | 502/302 |
| 5,294,419 | 3/1994 | Hiraoka et al. | 423/239.1 |
| 5,318,760 | 6/1994 | Subramanian et al. | 423/239.2 |
| 5,338,715 | 8/1994 | Iida et al. | 502/64 |
| 5,376,610 | 12/1994 | Takahata et al. | 502/66 |
| 5,388,406 | 2/1995 | Takeshima et al. | 60/297 |
| 5,399,324 | 3/1995 | Subramanian et al. | 423/213.7 |
| 5,610,117 | 3/1997 | Horiuchi et al. | 502/324 |

FOREIGN PATENT DOCUMENTS

| | | |
|---|---|---|
| 0125565 | 11/1984 | European Pat. Off. . |
| 0286967 | 10/1988 | European Pat. Off. . |
| 0362960 | 10/1989 | European Pat. Off. . |
| 0459396 | 12/1991 | European Pat. Off. . |
| 0491359 | 12/1991 | European Pat. Off. . |
| 0507590 | 4/1992 | European Pat. Off. . |
| 37 26 580 | 3/1988 | Germany . |
| 60-125250 | 7/1985 | Japan . |
| 62-14337 | 4/1987 | Japan . |
| 63-100919 | 5/1988 | Japan . |
| 63-178848 | 7/1988 | Japan . |
| 63-190642 | 8/1988 | Japan . |
| 63-190643 | 8/1988 | Japan . |
| 63-283727 | 11/1988 | Japan . |
| 1-139145 | 5/1989 | Japan . |
| 1-254251 | 10/1989 | Japan . |
| 3-196840 | 8/1991 | Japan . |
| 4-90826 | 3/1992 | Japan . |
| 4-250822 | 9/1992 | Japan . |
| 5-317720 | 12/1993 | Japan . |
| 6-378 | 1/1994 | Japan . |

OTHER PUBLICATIONS

European Search Report, EP 94 91 4570.

Primary Examiner—Gary P. Straub
Assistant Examiner—Timothy C. Vanoy
Attorney, Agent, or Firm—Omri M. Behr, Esq.

[57] ABSTRACT

The removal of nitrogen oxides from an exhaust gas is accomplished by a method which comprises causing the exhaust gas in an oxidizing atmosphere to contact a catalyst comprising a refractory inorganic oxide and catalytically active components, the components comprising 0.1 to 30 g per liter of the catalyst of at least one noble metal selected from the group consisting of Pt, Pd, Rh, and Ru or a compound of the noble metal and 1 to 80 g per liter of the catalyst of at least one metal selected from the group consisting of Li, K, Na, Rb, Ce, Be, Mg, Ca, St, and Ba or a compound of the metal, thereby inducing the catalyst to adsorb thereon the nitrogen oxides in the exhaust gas and, subsequently introducing a reducing substance intermittently into the exhaust gas thereby purifying the exhaust gas by reducing the nitrogen oxides adsorbed on the catalyst.

17 Claims, 1 Drawing Sheet

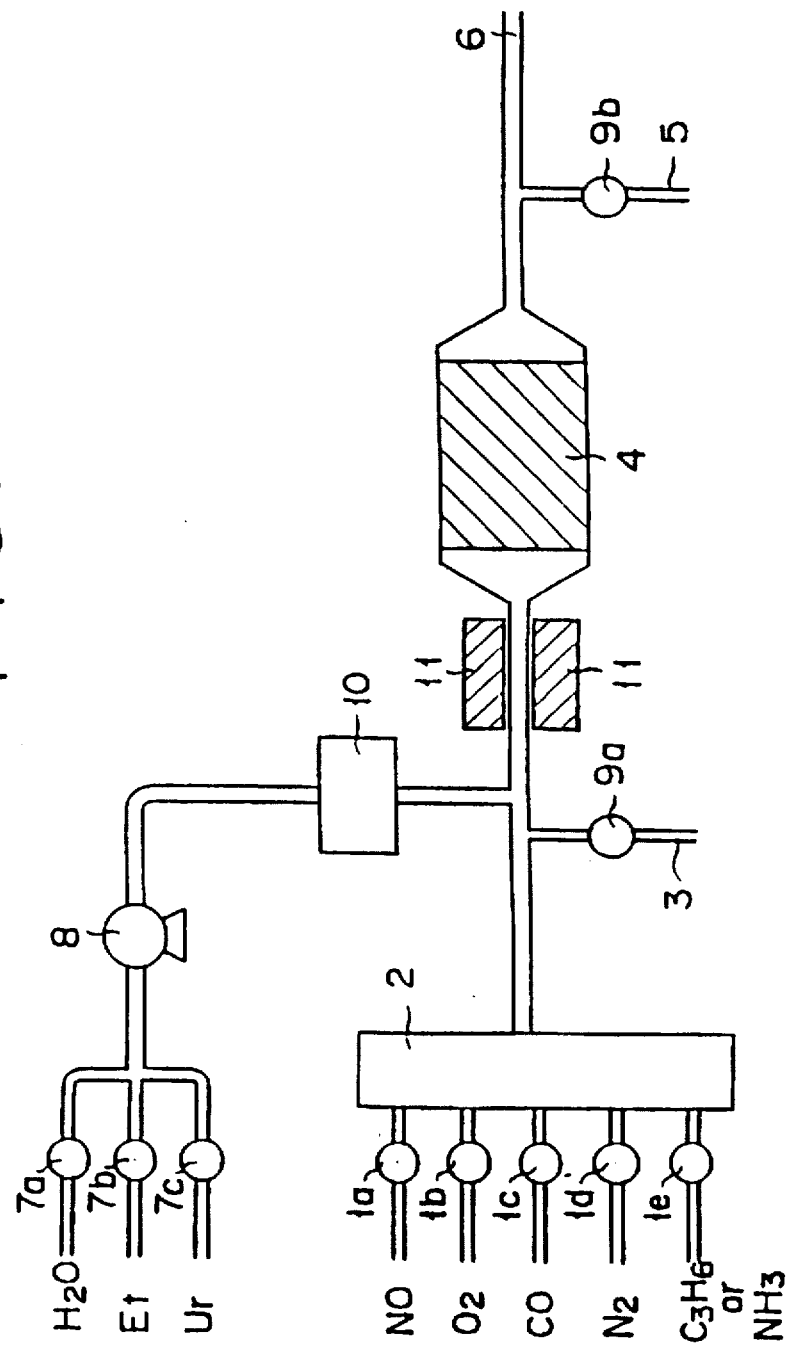

METHOD FOR REMOVAL OF NITROGEN OXIDES FROM EXHAUST GAS

This application is a continuation of application Ser. No. 08/234,989, filed Apr. 28, 1994, now abandoned.

TECHNICAL FIELD

This invention relates to purification of an industrial exhaust gas by removal of nitrogen oxides therefrom. More particularly, it relates to the purification of the industrial exhaust gas emanating as from a boiler, a power generation plant, an industrial plant, or an internal combustion engine like a gasoline or diesel engine by the removal of nitrogen oxides therefrom.

BACKGROUND ART

In recent years, the exhaust gases such as are emanating from internal combustion engines of automobiles, boilers, or industrial plants contain noxious substances such as nitrogen oxides (hereinafter occasionally referred to collectively as "$NO_x$") which form the cause for air pollution. Generally, the $NO_x$ are not easily reduced or decomposed in an oxidizing atmosphere (the atmosphere embracing the exhaust gas and having an oxygen supply more than necessary for complete combustion of the unburnt portion of the fuel entrained in the exhaust gas). As a result, the removal of the $NO_x$ from the exhaust gas is attained only with difficulty. Thus, the removal of $NO_x$ from a varying exhaust gas has been the subject of a scientific study in various fields.

For the purification of the exhaust gas from automobiles, it has been heretofore customary to adopt the method of treating the exhaust gas with a three-way catalyst thereby simultaneously removing $NO_x$, hydrocarbons (HC), and carbon monoxide (CO). By this method, the atmosphere of the exhaust gas to be treated is in the neighborhood of stoichiometry (which is the theoretical air-fuel ratio, namely the ratio of air required for complete combustion of the fuel). When the internal combustion engine is operated with the air introduced in an amount in excess of this theoretical air-fuel ratio, the oxygen is present at the site of treatment more than necessary for complete combustion of the unburnt portions such as of hydrocarbons and carbon monoxide in the exhaust gas. In the exhaust gas present in the oxidizing atmosphere of this kind, therefore, it is difficult to reduce, decompose, and remove the $NO_x$.

In respect to the diesel engines, boilers, etc., it is general to use a reducing agent such as ammonia, hydrogen, or carbon monoxide. This method, however, entails the problem of necessitating a special device for recovering and disposing of the unaltered portion of the reducing agent. It, therefore, cannot be effectively applied easily to a small $NO_x$ generating sources such as engines in automobiles or cogeneration systems in buildings. Particularly in the removal of $NO_x$ of a relatively low concentration, this method operates with notably low efficiency.

Recently as a means for the removal of $NO_x$, the method resorting to use of a $NO_x$ decomposing catalyst made of a copper ion-containing crystalline aluminosilicate has been proposed (as in JP-A-60-125,250, U.S. Pat. No. 4,297,328, etc.). This method is depicted therein simply as being capable of decomposing nitrogen monoxide (NO) into nitrogen ($N_2$) and oxygen ($O_2$). It does not easily obtain effective removal of $NO_x$ from the exhaust gas which emanates under actual conditions. Further, it is known that aluminosilicates are generally so deficient in resistance to heat as to offer no infallible use at elevated temperatures.

JP-A-63-100,919 has a mention to the effect that when the exhaust gas is treated with a copper-containing catalyst under an oxidizing atmosphere in the presence of a hydrocarbon, the reaction of the exhaust gas proceeds preferentially with the hydrocarbon and, therefore, the removal of $NO_x$ is obtained with high efficiency. It is remarked that the hydrocarbon to be used in this method may be either the hydrocarbon which is contained per se in the exhaust gas or the hydrocarbon which is added as occasion demands from an external source. Specifically, this method is carried out by first bringing the exhaust gas into contact with the copper-containing catalyst thereby removing $NO_x$ therefrom and then causing the residual exhaust gas to contact an oxidizing catalyst thereby removing hydrocarbons, carbon monoxide, etc. If the exhaust gas to be treated by this method happens to have an unduly low hydrocarbon content, the method will necessitate continuous introduction of the hydrocarbon into the exhaust gas. Further, in the oxidizing atmosphere, since the combustion of HC proceeds preferentially over the reaction of the hydrocarbon with $NO_x$, thorough removal of the $NO_x$ from the exhaust gas requires the hydrocarbon to be introduced in a large amount.

JP-A-04-250,822 discloses a method for purifying such an $NO_x$-containing air as generated in a tunnel by passing the air through an absorption tower thereby effecting absorption and concentration of the $NO_x$ and then introducing the separated $NO_x$ into a reaction tower packed with an $NO_x$ reducing catalyst. This method requires two devices, the one for absorption and the other for reduction of the $NO_x$.

A method which is capable of efficiently decomposing and removing the $NO_x$ from the exhaust gas and enabling a catalyst to manifest excellent durability to tolerate high temperatures and ideal packability in a reactor remains yet to be developed. Such is the existing state of the art.

An object of this invention, therefore, is to provide a method which is capable of efficiently removing $NO_x$ from exhaust gas in an oxidizing atmosphere while precluding the drawbacks mentioned above.

DISCLOSURE OF INVENTION

The object described above is accomplished by a method for the removal of nitrogen oxides from an exhaust gas characterized by causing the exhaust gas in an oxidizing atmosphere to contact a catalyst comprising a refractory inorganic oxide and catalytically active components, the components comprising 0.1 to 30 g as metal per liter of the catalyst of at least one noble metal selected from the group consisting of platinum, palladium, rhodium, and ruthenium or a compound of the noble metal and 1 to 80 g as metal per liter of the catalyst of at least one metal selected from the group consisting of lithium, potassium, sodium, rubidium, cesium, beryllium, magnesium, calcium, strontium, and barium or a compound of the metal, thereby inducing the catalyst to adsorb thereon the nitrogen oxides in the exhaust gas and, subsequently introducing a reducing substance intermittently into the exhaust gas thereby purifying the exhaust gas by reducing the nitrogen oxides adsorbed on the catalyst.

This invention further contemplates the method mentioned above, wherein as the component at least one heavy metal selected from the group consisting of manganese, copper, cobalt, molybdenum, tungsten, and vanadium or a compound of the heavy metal is further contained in an amount in the range of 0.1 to 50 g per liter of the catalyst. This invention also contemplates the method mentioned above, wherein the catalyst has a capacity for adsorbing the nitrogen oxides to saturation in the range of 6 to 30 m.mols per liter of the catalyst. This invention contemplates the method mentioned above, wherein the introduction of the reducing substance to the exhaust gas is effected by introducing a gas containing the reducing substance in an amount of 1 to 10 mols per mol of the nitrogen oxides (as NO) adsorbed on the catalyst for a period in the range of 0.1 to 20 seconds at intervals of 7 seconds to 60 minutes, preferably 7 seconds to 20 minutes. This invention further contemplates the method mentioned above, wherein the introduction of the reducing substance is effected before the amount of nitrogen oxides adsorbed on the catalyst reaches 50% of the capacity of the catalyst for adsorbing nitrogen oxides to saturation. This invention also contemplates the method mentioned above, wherein the exhaust gas is that from an internal combustion engine. This invention further contemplates the method mentioned above, wherein the introduction of the reducing substance into the exhaust gas is accomplished by lowering the air to fuel ratio in the suction system of the internal combustion engine. This invention also contemplates the method mentioned above, wherein the introduction of the reducing substance into the exhaust gas is accomplished by setting the air to fuel ratio in the suction system of the internal combustion engine at a theoretical level or an air-rich level. This invention further contemplates the method mentioned above, wherein the reducing substance is introduced into the exhaust gas from an external source.

The object described above is further accomplished by a method for the removal of nitrogen oxides from an exhaust gas characterized by installing on the upstream side of the flow of the exhaust gas a catalyst comprising 50 to 400 g per liter of the catalyst of a refractory inorganic oxide and catalytically active components, the components comprising 0.1 to 30 g as metal per liter of the catalyst of at least one noble metal selected from the group consisting of platinum, palladium, rhodium, and ruthenium or a compound of the noble metal and 1 to 80 g as metal per liter of the catalyst of at least one metal selected from the group consisting of lithium, potassium, sodium, rubidium, cesium, beryllium, magnesium, calcium, strontium, and barium or a compound of the metal and, at the same time, installing an oxidizing catalyst or a three-way catalyst on the downstream side of the flow of the exhaust gas.

The object described above is also accomplished by a method for the removal of nitrogen oxides from an exhaust gas characterized by installing on the upstream side of the flow of the exhaust gas a catalyst comprising 50 to 400 g per liter of the catalyst of a refractory inorganic oxide and catalytically active components, the components comprising 0.1 to 30 g as metal per liter of the catalyst of at least one noble metal selected from the group consisting of platinum, palladium, rhodium, and ruthenium or a compound of the noble metal, 1 to 80 g as metal per liter of the catalyst of at least one metal selected from the group consisting of lithium, potassium, sodium, rubidium, cesium, beryllium, magnesium, calcium, strontium, and barium or a compound of the metal, and 0.1 to 50 g per liter of the catalyst of at least one heavy metal selected from the group consisting of manganese, copper, cobalt, molybdenum, tungsten, and vanadium or a compound of the heavy metal and, at the same time, installing an oxidizing catalyst or a three-way catalyst on the downstream side of the flow of the exhaust gas.

This invention further contemplates the method mentioned above, wherein the oxidizing catalyst comprises 0.1 to 10 g per liter of the catalyst of at least one noble metal selected from the group consisting of platinum and palladium and 10 to 300 g per liter of the catalyst of a refractory oxide.

This invention also contemplates the method mentioned above, wherein the oxidizing catalyst further comprises 0.1 to 150 g per liter of the catalyst of at least one oxide of an element selected from the group consisting of rare earth elements, nickel, cobalt, and iron. This invention contemplates the method mentioned above, wherein the three-way catalyst comprises 10 to 300 g per liter of the catalyst of a refractory inorganic oxide and catalytic components, the components comprising 0.1 to 10 g as metal per liter of the catalyst of noble metal(s) selected from the group consisting of (a) palladium, (b) platinum and rhodium, (c) palladium and rhodium, and (d) platinum, palladium, and rhodium and 10 to 150 g as $CeO_2$ per liter of the catalyst of ceria. This invention further contemplates the method mentioned above, wherein the three-way catalyst further comprises 0.1 to 50 g as oxide per liter of the catalyst of at least one member selected from the group consisting of zirconia and rare earth elements except for cerium. This invention also relates to a method for the removal of nitrogen oxides from an exhaust gas characterized by installing a three-way catalyst or an oxidizing catalyst on the upstream side of the exhaust gas, a catalyst for the removal of the nitrogen oxides next thereto, and a three-way catalyst or an oxidizing catalyst on the downstream side.

BRIEF DESCRIPTION OF DRAWINGS

FIG. 1 is a schematic diagram illustrating an apparatus for experimenting a method for the removal of nitrogen oxides according to this invention.

BEST MODE FOR CARRYING OUT THE INVENTION

First, the principle of this invention will be described. In this invention, an exhaust gas containing $NO_x$ is brought into contact with a component manifesting an oxidizing activity in an oxidizing atmosphere so that NO, $N_2O$, etc. which are generally present at high proportions in the $NO_x$ components of the exhaust gas are oxidized or activated into $NO_2$. The $NO_2$ thus resulting from the oxidation or activation is then adsorbed on a component possessing an $NO_2$ adsorbing ability. By introducing a reducing substance instantaneously into the exhaust gas enveloping the $NO_x$ accumulated on the adsorbent component, the adsorbed $NO_x$ is reduced or decomposed to complete the removal of $NO_x$. It is the catalyst contemplated by this invention that discharges the function of reducing or decomposing the $NO_x$.

The reducing substances which are effectively usable in this invention include hydrocarbons, alcohols, urea and other similar organic substances, and ammonia and other similar inorganic substances, for example. As examples of particularly preferable reducing substances, the hydrocarbons may be saturated, unsaturated, linear, or branched hydrocarbons. They may be in a gaseous or liquid state at normal room temperature. The hydrocarbons which assume a gaseous state at normal room temperature are hydrocarbons having a carbon chain of $C_1$ to $C_4$ and those which assume a liquid state at normal room temperature are hydrocarbons having a carbon chain of $C_5$ to $C_{20}$. As occasion demands, such mixtures of hydrocarbons as gasoline, kerosene, and gas oil may be used. Likewise, the aforementioned alcohols may be saturated, unsaturated, linear, or branched alcohols. They have a carbon chain of $C_1$ to $C_6$. They may be dihydric or trihydric alcohols besides monohydric alcohols. The inorganic substances may be hydrogen and carbon monoxides besides ammonia.

The amount of the reducing substance to be introduced into the exhaust gas is preferable to be in the range of 1 to 10 mols, preferably 1 to 5 mols, as reducing substance per mol (as NO) of the nitrogen oxides adsorbed on the catalyst. This amount is computed based on one molecule of the reducing substance when the reducing substance is an inorganic substance or on one carbon atom thereof when the reducing substance is an organic substance.

This reducing substance generally is desired to be introduced in a gaseous state onto the catalyst. If the reducing substance is in a liquid state, however, it may be directly introduced in a sprayed state onto the catalyst with the aid of a nozzle, for example.

If the amount of the reducing substance to be introduced is less than 1 mol on the molar ratio defined above, the effect of the invention is not fully manifested. Conversely, if this amount exceeds 10 mols, the excess supply produces an unaltered portion of the reducing substance and poses a problem of disposal of the unaltered reducing substance, although the effect of the invention itself is infallibly manifested. The upper limit imposed on the introduction of the reducing agent, however, may shift within some extent, since the reducing agent treating activity of the catalyst is also concerned with the disposal.

While the aforementioned magnitude is expressed on the basis of the molar ratio of the reducing substance when the reducing substance is an inorganic substance, it is expressed on the basis of the number of carbon atoms of the reducing substance when the reducing substance is an organic substance. When the reducing substance happens to be urea, the magnitude expressed as 2 mols of ammonia is adopted.

The determination of the amount of the adsorbed nitrogen oxides may be attained, for example, by carrying out a preparatory experiment as described below. To be specific, this amount can be determined either directly in a given internal combustion engine operated under the conditions for working the method of this invention or indirectly in a desk-top apparatus adapted to simulate the temperature, composition, flow volume, etc. of the exhaust gas emanating from the internal combustion engine. Now, the procedure for the determination is shown below. First, in an exhaust gas pipe having nitrogen oxide analyzing meters disposed one each in front of and behind the prospective site for a catalyst bed, a catalyst conforming to this invention is packed in a prescribed amount to form the catalyst bed. Then, a mixed gas of oxygen and nitrogen set at the same temperature and flow volume as those of a given exhaust gas under the working conditions of the catalyst is passed through the apparatus until this apparatus is fully stabilized. Thereafter, a gas containing nitrogen oxides at a concentration under the working conditions of the catalyst is introduced instead of the mixed gas into the catalyst bed. The nitrogen oxide concentrations are measured continuously with the analyzing meters until the scale reading of the analyzing meter disposed behind the catalyst bed ceases to vary. Each momentary differences between the nitrogen oxide concentrations before and after the catalyst bed are integrated and the integrated amount is recorded as the amount of nitrogen oxides adsorbed on the catalyst.

The catalyst possibly has an ability to decompose nitrogen oxides during the measurement of the amount of nitrogen oxides to be adsorbed thereon. If the catalyst in use happens to possess this ability, the determination of the amount of adsorption cannot be based on the concentration of nitrogen oxides found in front of the catalyst bed. In this case, therefore, the amount of adsorption is computed, though in the same manner as described above, on the basis of the constant concentration of nitrogen oxides found behind the catalyst bed during the measurement of the amount of adsorption in the place of the concentration found in front of the catalyst bed.

When the reducing agent is intermittently introduced, the amount of the reducing agent to be introduced may be suitably selected in due consideration of the flow volume and flow rate of the exhaust gas, the concentration of the nitrogen oxides in the exhaust gas, and the capacity of the catalyst for adsorbing nitrogen oxides. It is preferable to introduce the reducing agent to the catalyst bed before the catalyst has adsorbed nitrogen oxides to saturation. This introduction before the saturation of adsorption is attained by preparatorily computing the amount of nitrogen oxides in the exhaust gas per unit time based on the flow volume and flow rate of the exhaust gas and the concentration of nitrogen oxides therein, estimating the maximum length of time within which the amount of nitrogen oxides adsorbed on the catalyst does not reach the level of saturation, and continuing the introduction of the reducing agent until the time expires.

The adsorption prior to reaching this state of saturation is preferable to be in the range of 5% to 90%, preferably 15% to 80%, of the saturated amount of adsorption. More preferably, it is in the range of 15% to 48%. If the amount of adsorption is less than 5%, the frequency of introducing the reducing agent must be increased possibly to the extent of jeopardizing the operating conditions of the apparatus. Conversely, if this amount exceeds 90%, on account of the approximation thereof to the saturated amount of adsorption, the adsorption of nitrogen oxides does not easily proceed and the amount of nitrogen oxides suffered to pass through the catalyst is consequently increased so much as to diminish the effect of this invention.

The reducing agent, depending on the quality thereof, has the possibility of being oxidized with the oxygen in the air and consequently prevented from manifesting an effect commensurate with the amount of its introduction. In this case, the deficiency is preferable to be compensated by preparatorily measuring the susceptibility of the reducing agent to the oxidation under the working conditions thereof as by use of an inert carrier and increasing the amount of the reducing agent being introduced proportionately to the degree of the susceptibility found as above.

The reducing substance may be introduced at any time when the result of actual measurement as mentioned above reaches an appropriate level, with an amount correlative to the level. Alternatively, as a convenient procedure, the reducing substance can be introduced with a prescribed time and amount schedule determined by repiating the former procedure suitable times, averaging the results of the mesurements, and deciding the amount of the reducing substance correlative to the average.

Preferably, the reducing agent for use in this invention is introduced at intervals in the range of 7 seconds to 60 minutes, preferably in the range of 10 seconds to 20 minutes. If the intervals are less than 10 seconds, the frequency of introduction will be so high as to force a sacrifice of efficiency or economy. Conversely, if they exceed 60 minutes, the capacity of the catalyst of this invention for adsorption of $NO_x$ will be surpassed possibly to the extent of bringing about an adverse effect on the purification of the exhaust gas by the removal of $NO_x$.

The duration of this introduction is in the range of 0.1 to 20 seconds, preferably 1 to 10 seconds. If this duration is less than 0.1 second, thorough removal of the adsorbed $NO_x$ will not be possibly obtained. If it exceeds 20 seconds, the disadvantage arises that the reducing substance will possibly fail to operate effectively.

Incidentally, the intervals of the introduction and the duration of the introduction of the reducing substance which are specified above as preferable for this invention are variable to a certain extent due to the kind of the catalyst to be used. They may be suitably varied, therefore, within the ranges mentioned above.

In the method of this invention, the $NO_x$ adsorbed on the catalyst in consequence of oxidation or activation is concentrated in an activated state on the catalyst as compared with the conventional method and, therefore, can be reduced by the catalyst with high selectivity unlike the method which comprises continuous introduction of the reducing agent. Thus, the method of this invention affords a saving in the total amount of the reducing agent to be introduced at all. The continued introduction of the reducing agent has the possibility of barring the oxidation or adsorption of the $NO_x$ and rather degrading the efficiency of purification of the exhaust gas by the removal of $NO_x$. In the suction system of the internal combustion engine, the $NO_x$ accumulated therein can be removed by instantaneously decreasing the amount of air being aspirated or supplying the fuel in an excess amount thereby enabling the exhaust gas to form a reducing atmosphere. By repeating the cycle described above, the removal of the $NO_x$ from the exhaust gas can be carried out continuously.

More preferably, the reducing substance is introduced under conditions such that the catalyst will adsorb $NO_x$ thereon while the exhaust gas is in the state of containing excess air and, during the conversion of the adsorbed $NO_x$ into less harmful substances, the oxygen concentration during the introduction of the reducing agent will be lowered to the extent of allowing the reaction of the accumulated nitrogen oxides with the reducing agent to proceed more readily than the oxidation of the reducing agent. Thus, the removal of the accumulated nitrogen oxides can be carried out more efficiently.

The exhaust gas to which the method of this invention is applied is not particularly limited. The method is effective when the exhaust gas to be treated forms an atmosphere of excess oxygen containing $NO_x$ in the range of 1 to 5,000 ppm. It is more effective when the exhaust gas forms an atmosphere of excess oxygen containing $NO_x$ in the range of 100 to 3,000 ppm. The conventional method suffices when the exhaust gas to be treated does not form an oxidizing atmosphere. If the $NO_x$ content is less than 1 ppm, the adsorption side will be at a disadvantage from the stoichiometric standpoint of adsorption. If it exceeds 5,000 ppm, the disadvantage will arise that the introduction of the reducing substance must be frequently carried out. This invention does not require the presence of an oxidizing atmosphere throughout the entire period of the purification of the exhaust gas. It can be effectively utilized even where an oxidizing atmosphere and a reducing atmosphere are alternated repeatedly.

This invention in principle is capable of accomplishing the removal of $NO_x$ from the exhaust gas under treatment without reference to the $NO_x$ concentration in the exhaust gas. When the exhaust gas under treatment contains nitrogen oxides at a high concentration, the duration of introduction of the reducing agent or the duration of impartation of a reducing atmosphere to the exhaust gas must be shortened. For this invention, the space velocity (S.V.) of the exhaust gas under treatment relative to the catalyst bed is preferable to be in the range of 1,000 to 300,000/hr, preferably 10,000 to 200,000/hr. If the space velocity exceeds 300,000/hr, the catalyst will manifest ample reactivity with difficulty. Conversely, if it falls short of 1,000/hr, the catalyst will have to be increased in volume and, moreover, the diffusion in the flow path of gas will bring about the influence of nullifying the effect of intermittently introducing the reducing substance or imparting a reducing atmosphere to the exhaust gas.

The catalyst to be used in this invention comprises (A) catalytically active components composed of (a) 0.1 to 30 g as metal per liter of the catalyst of at least one noble metal selected from the group consisting of platinum, palladium, rhodium, and ruthenium or a compound of the noble metal and (b) 1 to 80 g as metal per liter of the catalyst of at least one alkali or alkaline earth metal selected from the group consisting of lithium, potassium, sodium, rubidium, cesium-beryllium, magnesium, calcium, strontium, and barium or a compound of the metal and (B) a refractory inorganic oxide and optionally further comprises as another catalycally active component 0.1 to 50 g per liter of the catalyst of at least one heavy metal selected from the group consisting of manganese, copper, cobalt, molybdenum, tungsten, and vanadium or a compound of the heavy metal.

In the components mentioned above, such noble metals as platinum, palladium, rhodium, and ruthenium, particularly platinum and/or palladium, are effective in oxidizing $NO_x$ in an oxidizing atmosphere. These noble metals function to reduce and decompose $NO_x$ in the presence of a reducing substance or in a reducing atmosphere besides functioning to oxide $NO_x$ in an oxidizing atmosphere. By using these noble metals, therefore, the oxidation or activation of $NO_x$ in an oxidizing atmosphere and the removal of the adsorbed $NO_x$, particularly $NO_2$, due to the intermittent introduction of a reducing substance or in a reducing atmosphere can be carried out with high efficiency. The amount of such a noble metal to be used is in the range of 0.1 to 30 g, preferably 0.5 to 5 g, as metal per liter of the catalyst. If this amount is less than 0.1 g, the oxidation of $NO_x$ will not easily proceed and the amount of $NO_x$ to be adsorbed will be unduly small and the reduction and removal of the adsorbed $NO_x$ will not be amply effected. Conversely, if it exceeds 30 g, the excess noble metal will produce no proportionate addition to the effect of noble metal and will increase the cost of material possibly to the extent of impairing the economy of the operation.

As the component for adsorbing the oxidized and activated $NO_x$, particularly $NO_2$, alkali metals such as lithium, sodium, potassium, rubidium, and cesium or compounds thereof and/or alkaline earth metals such as magnesium, calcium, strontium, and barium or compounds thereof, particularly the compounds of alkali metals, are effectively used. The amount of this component to be used is in the range of 1 to 80 g, preferably 5 to 50 g, as metal per liter of the catalyst. If this amount is less than 1 g, the component acquires no sufficient capacity for adsorption of $NO_x$ and, therefore, manifests an unduly low capacity for treatment of $NO_x$. Conversely, if the amount exceeds 80 g, the capacity for treatment of $NO_x$ will be degraded because the basicity grows fairly strong possibly to the extent of enhancing the fast adsorption of $NO_x$, the extent of curbing the oxidation of $NO_x$ and the reduction of $NO_x$ by the noble metal. Among other alkali metals mentioned above, potassium and sodium prove particularly preferable. In this specification, the amount of the alkali metal mentioned above will be indicated as reduced to metal unless otherwise specified.

The purification of the exhaust gas by the removal of $NO_x$ can be carried out with greater efficiency when at least one metal selected from the group consisting of manganese, copper, cobalt, molybdenum, tungsten, and vanadium or a compound of the metal is used as another catalytically active component in addition to the components mentioned above. This catalytically active component is thought to play the part of promoting the oxidation and adsorption of $NO_x$ in an oxidizing atmosphere and/or promoting the reduction and decomposition of the adsorbed $NO_x$ in the presence of a reducing agent or in an oxidizing atmosphere.

The amount of this component to be used is in the range of 0.1 to 50 g, preferably 1 to 20 g, per liter of the catalyst. If this amount is less than 0.1 g, neither the adsorption of nitrogen oxides nor the reduction of the adsorbed $NO_x$ will be amply promoted. Conversely, if the amount exceeds 50 g, the excess component will not bring about any proportionate addition to the capacity for $NO_x$ adsorption or the capacity for $NO_x$ reduction.

As the refractory inorganic oxide, any of the inorganic oxides which are generally used as carriers for catalysts can be adopted. As typical examples of these inorganic oxides, $\alpha$-alumina, $\gamma$-, $\delta$-, $\eta$-, or $\theta$-activated alumina, titania, zirconia, ceria, lanthana, or silica, mixtures thereof, and complex oxides may be cited. The amount of the refractory inorganic oxide to be used is in the range of 50 to 400 g, preferably 100 to 300 g, per liter of the catalyst. The weight of the oxide will be computed based on stable oxide unless otherwise specified. The refractory inorganic oxide is generally in a powdery form. The Brunauer-Emmett-Teller (hereinafter referred to as "BET") surface area of the oxide is in the range of 10 to 400 $m^2/g$, preferably 50 to 300 $m^2/g$.

For the purpose of enabling the adsorption and oxidation of $NO_x$ to proceed continuously with high efficiency, the oxidizing component, the adsorbing component, and the auxiliary component of the catalyst are preferable to be carried in a homogeneously mixed state on the refractory inorganic oxide instead of being locally distributed.

In this invention, the mixture comprising the catalytically active components and the refractory inorganic oxide, in the actual treatment of the exhaust gas, is used in the unmodified powdery form, in the molded form thereof such as pellets or honeycombs, or in the coating form to a three-dimensional structure base. Among other forms mentioned above, the form using the three-dimensional structure for coating proves particularly preferable. As typical examples of the three-dimensional structure, pellets and honeycomb carriers may be cited. Among other three-dimensional structures, monolithically molded honeycomb structures prove particularly preferable. As typical examples of the monolithically molded honeycomb structures, monolithic honeycomb carriers, metal honeycomb carriers, and plug honeycomb carriers may be cited.

The monolithic carriers may be any of those which are generally called the ceramic honeycomb carriers. Particularly, the honeycomb carriers which are made of such materials as cordierite, mullite, $\alpha$-alumina, zirconia, titania, titanium phosphate, aluminum titanate, bellite, spodumene, aluminosilicate, and magnesium silicate prove preferable. Among other examples cited above, the honeycomb carriers made of cordierite prove especially preferable. The monolithically molded structures which are made of such metals resistant to oxidation and proof against heat as stainless steel and Fe—Cr—Al alloy are also usable.

These monolithic carriers are produced by the extrusion molding technique or the process of tightly rolling a sheetlike material. The openings (cells) formed therein for passage of a gas under treatment may be in a hexagonal, tetragonal, or triangular cross section or in a corrugated cross section. A cell density (number of cells/unit cross section) which falls in the range of 100 to 600 cells/square inch, preferably 200 to 500 cells/square inch, suffices for effective use of the monolithic carriers.

The amount of the mixture of the catalytically active components and the refractory inorganic oxide to be deposited on the honeycomb structure is in the range of 50 to 500 g, preferably 100 to 300 g, per liter of the catalyst. If this amount is less than 50 g, the mixture fails to manifest ample activity because of an unduly small amount thereof. If the amount exceeds 500 g, the disadvantage arises that the exhaust gas under treatment will suffer as from loss of pressure.

The amount of the catalytically active components to be used per liter of the catalyst is computed based on the volume of the molded structure itself when those components are molded by themselves or based on a three-dimensional structure when the components are deposited on the three-dimensional structure base.

Any of the examples of method which will be adduced hereinbelow can be adopted for the preparation of the catalyst. Some other method than the methods shown below may be adopted providing it causes no deviation from the spirit of this invention. The examples are (a) a method for obtaining a finished catalyst by impregnating a refractory inorganic oxide with a mixed solution of catalytically active components, drying the resultant impregnated composite, optionally calcining the dry composite thereby obtaining a powder, wet pulverizing the powder together with water added thereto and consequently forming a slurry, applying the slurry to a honeycomb structure and allowing the applied coat of slurry to dry, and optionally calcining the coated honeycomb structure, (b) a method for obtaining a finished catalyst by wet pulverizing a refractory inorganic oxide together with water added thereto thereby forming a slurry, applying the slurry to a honeycomb structure and drying the applied coat of slurry, optionally calcining the resultant dry coated honeycomb structure, then impregnating the coated honeycomb structure with a mixed solution of catalytically active components, drying the impregnated honeycomb structure, and optionally calcining the dry honeycomb structure, and (c) a method for obtaining a finished catalyst by impregnating a refractory inorganic oxide with a mixed solution of part(s) of catalytically active components (such as, for example, an $NO_x$ oxidizing component), drying and optionally calcining the resultant impregnated composite thereby forming a powder, wet pulverizing the powder together with water added thereto and consequently forming a slurry, applying the slurry to a honeycomb structure and drying the applied coat of slurry, optionally calcining the dry coated honeycomb structure, then impregnating the structure with a mixed solution of remaining part(s) of catalytically active components (such as, for example, an $NO_x$ adsorbing component), and drying and optionally calcining the impregnated structure. The raw materials which are usable for the formation of catalytically active components include nitrides, chlorides, sulfates, carbonates, and acetates, for example.

When the exhaust gas under treatment contains hydrocarbons, carbon monoxide, etc. at high concentrations, the catalyst mentioned above may be used in combination with an oxidizing catalyst or a three-way catalyst. In this case, the catalyst described above may be disposed in the leading stage and the oxidizing catalyst or three-way catalyst in the trailing stage relative to the inlet for the exhaust gas. Particularly when the exhaust gas contains hydrocarbons, carbon monoxide, etc. at high concentrations, the three-way catalyst is used for the purpose of enhancing the stoichiometric conversion of $NO_x$ with the oxidizing catalyst.

When the exhaust gas under treatment has a low temperature, the ratio of purification of the exhaust gas is low as when an automobile is being started. The low temperature is undesirable because it causes particularly the ratios of removal of CO and HC to be conspicuously increased. In this case, the ratio of conversion of HC can be enhanced by preparatorily elevating the temperature of the exhaust gas. The purification of the exhaust gas may be carried out with a three-way catalyst or an oxidizing catalyst installed as a warm-up catalyst.

In this case, the removal of nitrogen oxides from the exhaust gas may be effected by a method of disposing the three-way catalyst or oxidizing catalyst on the upstream side of the flow of the exhaust gas, then the catalyst set forth in claim 1 next thereto, and the three-way catalyst or oxidizing catalyst farther on the downstream side.

The oxidizing catalyst has no particular restriction. It is only required to be capable of oxidizing hydrocarbons and carbon monoxide. The catalytic components which are effectively usable in the oxidizing catalyst include noble metals such as platinum and/or palladium and refractory inorganic oxides such as alumina, titania, and silica, for example. One or more members selected from among rare earth oxides such as lanthanum oxide ($La_2O_3$) and from among metals such as iron, cobalt and nickel may be additionally used. The amount of the noble metal to be preferable is desired to be in the range of 0.1 to 5 g per liter of the catalyst. The amount of the refractory inorganic oxide to be carried is preferable to be in the range of 10 to 300 g per liter of the catalyst. When the oxide of a rare earth element is additionally incorporated in the catalyst, the amount thereof is preferable to be within the range of>0 to 150 g per liter of the catalyst. If the amount of the noble metal is less than 0.1 g per liter, the catalyst will acquire only an unduly low capacity for the purification. If it exceeds 5 g per liter, the excess supply of the noble metal will bring about no proportionate addition to the effect. If the amount of the refractory inorganic oxide to be added is less than 10 g per liter, the ability to disperse the noble metal will be degraded intolerably. If it exceeds 300 g per liter, the excess supply of the inorganic oxide will bring about the adverse effect of clogging a honeycomb being used as a carrier for the refractory inorganic oxide. The oxide of a rare earth element is added for the purpose of improving the thermal stability of the refractory inorganic oxide. If the amount of this oxide to be added exceeds 150 g per liter of the catalyst, the excess supply of the oxide will bring about the adverse effect of intolerably degrading the strength with which the catalytic component is carried. In the present invention, when the catalyst comprising at least one metal selected from the group consisting of platinum and palladium, at least one metal selected from the group consisting of potassium, sodium, rubidium, and cesium, and a refractory inorganic oxide is disposed on the upstream side of the flow of the exhaust gas and then an oxidizing catalyst is disposed next thereto, the contents of CO, HC, etc. in the exhaust gas can be further lowered than when no oxidizing catalyst is used.

Generally, (a) palladium, (b) platinum and rhodium, (c) palladium and rhodium, or (d) platinum, palladium, and rhodium as noble metal component(s), a refractory inorganic oxide such as alumina, titania, or silica, and ceria are essential catalytic components for the three-way catalyst. This three-way catalyst may additionally incorporate therein zirconia and/or the oxide of a rare earth element other than cerium such as, for example, lanthanum oxide ($La_2O_3$). The three-way catalyst is generally prepared by having the catalytic components deposited on a honeycomb which is generally used as a carrier for a catalyst. The amount of the noble metal to be deposited is preferable to be in the range of 0.1 to 5 g, the amount of such a refractory inorganic oxide as alumina, titania, or silica to be in the range of 10 to 300 g, the amount of ceria ($Ce_2O_3$) to be in the range of 10 to 150 g, and the amount of the oxide of a rare earth element other than cerium to be in the range of 0 to 50 g respectively per liter of the catalyst. If the amount of the noble metal is less than 0.1 g per liter, the catalyst will acquire an unduly low capacity for the purification. If the amount exceeds 5 g per liter, the excess supply of the noble metal will bring about no discernible addition to the effect of noble metal. If the amount of the refractory inorganic oxide is less than 10 g per liter, the insufficient supply of this oxide will produce the adverse effect of impairing the ability thereof to disperse the noble metal, for example. If this amount exceeds 300 g per liter, the excess supply of this oxide will bring about the adverse effect of clogging a honeycomb being used as a carrier for the refractory inorganic oxide. If the amount of ceria is less than 10 g per liter, the effect of ceria manifested in storing and discharging oxygen will not be fully manifested throughout the entire volume of the catalyst. If this amount exceeds 150 g per liter, the excess supply of ceria will produce the adverse effect of degrading the strength with which the catalytic components are carried. The addition of the oxide of a rare earth element other than cerium is intended to improve the thermal stability of the refractory inorganic oxide. If the amount of this oxide to be added exceeds 50 g per liter, the excess supply of the oxide will produce the adverse effect of degrading the strength with which the catalytic components are carried because ceria is deposited to some extent on the three-way catalyst. The three-way catalyst removes $NO_x$ in a stoichiometric condition. It fails to effect the removal of $NO_x$ in a lean condition. This invention, however, allows the removal of $NO_x$ to proceed in a stoichiometric condition to a greater extent when a catalyst comprising at least one metal selected from the group consisting of platinum and palladium, at least one metal selected from the group consisting of potassium, sodium, rubidium, and cesium, and a refractory inorganic oxide is disposed on the upstream side of the flow of the exhaust gas and a three-way catalyst is disposed next thereto than when no three-way catalyst is disposed at all.

Typical examples of the three-way catalyst of this kind are cited below.

(a) A three-way catalyst having carried on a monolithic structure carrier a mixture comprising 10 to 300 g of activated alumina and catalytically active components composed of 0.5 to 30 g of palladium, 0.1 to 50 t of an alkaline earth metal oxide, 10 to 150 g of cerium oxide, and 0.1 to 50 g of zirconium oxide per liter of the catalyst (Japanese Patent Application No. 04-82,311).

(b) A three-way catalyst having carried on a monolithic structure carrier a mixture comprising 10 to 300 g of activated alumina and catalytically active components composed of 0.5 to 30 g of palladium, 0.1 to 50 g of an alkaline earth metal oxide, 0.1 to 50 g of lanthanum oxide, 10 to 150 g of cerium oxide, and 0.1 to 50 g of zirconium oxide per liter of the catalyst (Japanese Patent Application No. 04-149,400).

(c) A three-way catalyst having carried on a monolithic structure carrier a mixture comprising 10 to 300 g of activated alumina and catalytically active components composed of 0.5 to 30 g of palladium, 0.1 to 50 g of an alkaline earth metal oxide, 10 to 150 g of cerium oxide, 0.1 to 50 g of zirconium oxide, and 1 to 150 g of titanium oxide per liter of the catalyst (Japanese Patent Application No. 04-166,383).

(d) A three-way catalyst having carried on a monolithic structure carrier a mixture comprising 10 to 300 g of activated alumina and catalytically active components composed of 0.5 to 30 g of palladium, 0.1 to 50 g of an alkaline earth metal oxide, 10 to 150 g of cerium oxide, 0.1 to 50 g of zirconium oxide, and 0.1 to 50 g of silicon oxide per liter of the catalyst (Japanese Patent Application No. 04-166,460).

(e) A three-way catalyst having carried on a monolithic structure carrier a mixture comprising 10 to 300 g of activated alumina and catalytically active components composed of 0.5 to 30 g of palladium, 0.1 to 50 g of an alkaline earth metal oxide, 10 to 150 g of cerium oxide, 0.1 to 50 g of zirconium oxide, 1 to 150 g of titanium oxide, and 0.05 to 50 g of silicon oxide per liter of the catalyst (Japanese Patent Application No. 04-167,136).

(f) A three-way catalyst having carried on a monolithic structure carrier a mixture comprising 10 to 300 g of activated alumina and catalytically active components composed of 0.1 to 20 g of the oxide of at least one metal selected from the group consisting of iron, cobalt, and nickel, 0.5 to 30 g of palladium, 0.1 to 50 g of an alkaline earth metal oxide, 10 to 150 g of cerium oxide, and 0.1 to 50 g of zirconium oxide per liter of the catalyst (Japanese Patent Application No. 04-167,363).

(g) A three-way catalyst having carried on a monolithic structure carrier a mixture comprising 20 to 200 g of activated alumina and catalytically active components composed of 0.1 to 5 g as a total of platinum and palladium, 0.01 to 1 g of rhodium, and 10 to 150 g of cerium oxide per liter of the catalyst (JP-A-62-91,244).

(h) A three-way catalyst having carried on a monolithic structure carrier 0.1 to 10 g of noble metal, 1 to 150 g of cerium oxide, and 50 to 200 g of a refractory inorganic oxide (JP-A-01-27,643).

Now, the present invention will be described more specifically below with reference to working examples. It is to be distinctly understood that the invention is not limited thereto, but may be otherwise variously embodied and practiced without departure from the spirit of this invention.

REFERENCE EXAMPLE 1

A powder was obtained by mixing 200 g of activated alumina having a BET surface area of 100 m²/g with an aqueous dinitrodiammineplatinum solution containing 3 g of platinum, drying the resultant mixture at 120° C. for 2 hours, and calcining the dry mixture at 500° C. for 2 hours. This powder was wet pulverized in a ball mill to obtain an aqueous slurry.

A cordierite honeycomb carrier (the product of Nippon Glass Co., Ltd.: containing 400 gas flow cells per square inch of cross section and measuring 33 mm in diameter, 76 mm in length, and 65 ml in volume) was dipped in the aqueous slurry, then removed therefrom, and blown with compressed air to expel excess slurry. Then, the carrier coated with the slurry was dried at 120° C. for 2 hours and calcined at 500° C. for 2 hours to obtain a honeycomb carrier coated with a platinum-carrying alumina powder. The honeycomb carrier was dipped in an aqueous solution containing sodium nitrate at a concentration of 4.3 mols/liter, removed therefrom, blown with compressed air to expel excess aqueous solution therefrom, dried at 120° C., and calcined at 500° C. to obtain a finished catalyst (1). This catalyst was found to have deposited on the carrier 3 g of platinum, 10 g of sodium (as metal), and 200 g of activated alumina per liter of the carrier.

REFERENTIAL EXAMPLE 2

A finished catalyst (2) was obtained by following the procedure of Referential Example 1 while using an aqueous palladium nitrate solution containing 3 g of palladium in the place of the aqueous dinitrodiammineplatinum solution containing 3 g of platinum. This catalyst was found to have deposited on the carrier 3 g of palladium, 10 g of sodium, and 200 g of activated alumina per liter of the carrier.

REFERENTIAL EXAMPLE 3

A finished catalyst (3) was obtained by following the procedure of Referential Example 1 while using an aqueous rhodium nitrate solution containing 3 g of rhodium in the place of the aqueous dinitrodiammineplatinum solution containing 3 g of platinum. This catalyst was found to have deposited on the carrier 3 g of rhodium, 10 g of sodium, and 200 g of activated alumina per liter of the carrier.

REFERENTIAL EXAMPLE 4

A finished catalyst (4) was obtained by following the procedure of Referential Example 1 while using an aqueous ruthenium chloride solution containing 3 g of ruthenium in the place of the aqueous dinitrodiammineplatinum solution containing 3 g of platinum. This catalyst was found to have deposited on the carrier 3 g of ruthenium, 10 g of sodium, and 200 g of activated alumina per liter of the carrier.

REFERENTIAL EXAMPLE 5

A finished catalyst (5) was obtained by following the procedure of Referential Example 1 while using an aqueous solution containing lithium nitrate at a concentration of 14.4 mols/liter in the place of the aqueous solution containing sodium nitrate at a concentration of 4.3 mols/liter. This catalyst was found to have deposited on the carrier 3 g of platinum, 10 g of lithium, and 200 g of activated alumina per liter of the carrier.

REFERENTIAL EXAMPLE 6

A finished catalyst (6) was obtained by following the procedure of Referential Example 1 while using an aqueous solution containing potassium nitrate at a concentration of 2.6 mols/liter in the place of the aqueous solution containing sodium nitrate at a concentration of 4.3 mols/liter. This catalyst was found to have deposited on the carrier 3 g of platinum, 10 g of potassium, and 200 g of activated alumina per liter of the carrier.

REFERENTIAL EXAMPLE 7

A finished catalyst (7) was obtained by following the procedure of Referential Example 1 while using an aqueous solution containing rubidium nitrate at a concentration of 1.2 mols/liter in the place of the aqueous solution containing sodium nitrate at a concentration of 4.3 mols/liter. This catalyst was found to have deposited on the carrier 3 g of platinum, 10 g of rubidium, and 200 g of activated alumina per liter of the carrier.

REFERENTIAL EXAMPLE 8

A finished catalyst (8) was obtained by following the procedure of Referential Example 1 while using an aqueous solution containing cesium nitrate at a concentration of 0.8 mol/liter in the place of the aqueous solution containing sodium nitrate at a concentration of 4.3 mols/liter. This catalyst was found to have deposited on the carrier 3 g of platinum, 10 g of cesium, and 200 g of activated alumina per liter of the carrier.

REFERENTIAL EXAMPLE 9

A finished catalyst (9) was obtained by following the procedure of Referential Example 1 while using an aqueous solution containing beryllium nitrate at a concentration of 11.1 mols/liter in the place of the aqueous solution containing sodium nitrate at a concentration of 4.3 mols/liter. This catalyst was found to have deposited on the carrier 3 g of platinum, 10 g of beryllium, and 200 g of activated alumina per liter of the carrier.

REFERENTIAL EXAMPLE 10

A finished catalyst (10) was obtained by following the procedure of Referential Example 1 while using an aqueous solution containing magnesium nitrate at a concentration of 8.2 mols/liter in the place of the aqueous solution containing sodium nitrate at a concentration of 4.3 mols/liter. This catalyst was found to have deposited on the carrier 3 g of platinum, 20 g of magnesium, and 200 g of activated alumina per liter of the carrier.

REFERENTIAL EXAMPLE 11

A finished catalyst (11) was obtained by following the procedure of Referential Example 1 while using an aqueous solution containing calcium nitrate at a concentration of 5.0 mols/liter in the place of the aqueous solution containing sodium nitrate at a concentration of 4.3 mols/liter. This catalyst was found to have deposited on the carrier 3 g of platinum, 20 g of calcium, and 200 g of activated alumina per liter of the carrier.

REFERENTIAL EXAMPLE 12

A finished catalyst (12) was obtained by following the procedure of Referential Example 1 while using an aqueous solution containing strontium nitrate at a concentration of 2.3 mols/liter in the place of the aqueous solution containing sodium nitrate at a concentration of 4.3 mols/liter. This catalyst was found to have deposited on the carrier 3 g of platinum, 20 g of strontium, and 200 g of activated alumina per liter of the carrier.

REFERENTIAL EXAMPLE 13

A finished catalyst (13) was obtained by following the procedure of Referential Example 1 while using an aqueous solution containing barium acetate at a concentration of 1.5 mols/liter in the place of the aqueous solution containing sodium nitrate at a concentration of 4.3 mols/liter. This catalyst was found to have deposited on the carrier 3 g of platinum, 20 g of barium, and 200 g of activated alumina per liter of the carrier.

REFERENTIAL EXAMPLE 14

A finished catalyst (14) was obtained by following the procedure of Referential Example 1 while using a mixed aqueous solution containing dinitrodiammineplatinum incorporating 3 g of platinum therein and copper nitrate incorporating 2 g of copper therein in the place of the aqueous dinitrodiammineplatinum solution containing 3 g of platinum. This catalyst was found to have deposited on the carrier 3 g of platinum, 2 g of copper, 10 g of sodium, and 200 g of activated alumina per liter of the carrier.

REFERENTIAL EXAMPLE 15

A finished catalyst (15) was obtained by following the procedure of Referential Example 1 while using a mixed aqueous solution containing dinitrodiammineplatinum incorporating 3 g of platinum therein and cobalt nitrate incorporating 2 g of cobalt therein in the place of the aqueous dinitrodiammineplatinum solution containing 3 g of platinum. This catalyst was found to have deposited on the carrier 3 g of platinum, 2 g of cobalt, 10 g of sodium, and 200 g of activated alumina per liter of the carrier.

REFERENTIAL EXAMPLE 16

A finished catalyst (16) was obtained by following the procedure of Referential Example 1 while using a mixed aqueous solution containing dinitrodiammineplatinum incorporating 3 g of platinum therein and manganese nitrate incorporating 2 g of manganese therein in the place of the aqueous dinitrodiammineplatinum solution containing 3 g of platinum. This catalyst was found to have deposited on the carrier 3 g of platinum, 2 g of manganese, 10 g of sodium, and 200 g of activated alumina per liter of the carrier.

REFERENTIAL EXAMPLE 17

A finished catalyst (17) was obtained by preparing a catalyst (A) in the same manner as in Referential Example 1, dipping this catalyst in an aqueous solution containing ammonium molybdate at a concentration of 0.5 mol/liter, removing the catalyst therefrom, blowing the wet catalyst with compressed air to expel excess aqueous solution therefrom, drying the catalyst at 120° C., and calcining the dry catalyst at 500° C. This finished catalyst was found to have deposited on the carrier 3 g of platinum, 10 g of sodium, 5 g of molybdenum, and 200 g of activated alumina per liter of the carrier.

REFERENTIAL EXAMPLE 18

A finished catalyst (18) was obtained by preparing a catalyst (A) in the same manner as in Referential Example 1, dipping this catalyst in an aqueous solution containing ammonium tungstate at a concentration of 0.3 mol/liter, removing the catalyst therefrom, blowing the wet catalyst with compressed air to expel excess aqueous solution therefrom, drying the catalyst at 120° C., and calcining the dry catalyst at 500° C. This finished catalyst was found to have deposited on the carrier 3 g of platinum, 10 g of sodium, 5 g of tungsten, and 200 g of activated alumina per liter of the carrier.

REFERENTIAL EXAMPLE 19

A finished catalyst (19) was obtained by preparing a catalyst (A) in the same manner as in Referential Example 1, dipping this catalyst in an aqueous solution containing vanadyl oxalate at a concentration of 1.0 mol/liter, removing the catalyst therefrom, blowing the wet catalyst with compressed air to expel excess aqueous solution therefrom, drying the catalyst at 120° C., and calcining the dry catalyst at 500° C. This finished catalyst was found to have deposited on the carrier 3 g of platinum, 10 g of sodium, 5 g of vanadium, and 200 g of activated alumina per liter of the carrier.

REFERENTIAL EXAMPLE 20

A powder was obtained by mixing 100 g of the same activated alumina as used in Referential Example 1 with a mixed solution of an aqueous dinitrodiammineplatinum solution containing 2 g of platinum and an aqueous rhodium nitrate solution containing 0.4 g of rhodium, drying the resultant mixture at 120° C. for two hours, and calcining the dry mixture at 500° C. for two hours. This powder and 50 g of cerium oxide were wet pulverized together in a ball mill to obtain an aqueous slurry. The same honeycomb carrier as used in Referential Example 1 was dipped in the aqueous slurry, removed therefrom, and blown with compressed air to expel excess aqueous slurry. Then the resultant composite was dried at 120° C. for 2 hours to obtain a finished catalyst (20). This catalyst was found to have deposited on the carrier 2 g of platinum, 0.4 g of rhodium, 50 g of cerium oxide, and 100 g of activated alumina per liter of the carrier.

REFERENTIAL EXAMPLE 21

Zeolite, grade ZSM-5, was prepared in accordance with the information reported in literature (Rapid Crystallization Method, Proceedings 8th International Congress on Catalysis, Berin, 1984, Vol. 3, P 569). By the X-ray analysis, the zeolite thus obtained was identified as the product of grade ZSM-5. To the mixture obtained by stirring 1.5 kg of this zeolite, grade ZSM-5, and 6 liters of purified water added thereto at 98° C. for two hours, an aqueous solution containing copper ammine complex at a concentration of 0.2 mol/liter was slowly added dropwise at 80° C. After the addition was completed, the resultant mixture was stirred continuously at 80° C. for 12 hours. It was cooled to normal room temperature and then filtered to separate the zeolite. The zeolite was thoroughly washed and dried at 120° C. for 24 hours. The powder consequently obtained was wet pulverized in a ball mill to obtain an aqueous slurry. Thereafter, a finished catalyst (21) was obtained by following the procedure of Referential Example 1 while using the aqueous slurry instead. This catalyst was found to have deposited on the carrier 120 g of the zeolite, grade ZSM-5, and 6.9 g of copper per liter of the carrier.

REFERENTIAL EXAMPLE 22

A finished catalyst (22) was obtained by following the procedure of Referential Example 6 while using 0.05 g of platinum in the place of the aqueous dinitrodiammineplatnum solution containing 3 g of platinum. This catalyst was found to have deposited on the carrier 0.05 g of platinum, 10 g of potassium, and 200 g of activated alumina per liter of the carrier.

REFERENTIAL EXAMPLE 23

A finished catalyst (23) was obtained by following the procedure of Referential Example 6 while using 0.2 g of platinum in the place of the aqueous dinitrodiammineplatnum solution containing 3 g of platinum. This catalyst was found to have deposited on the carrier 0.2 g of platinum, 10 g of potassium, and 200 g of activated alumina per liter of the carrier.

REFERENTIAL EXAMPLE 24

A finished catalyst (24) was obtained by following the procedure of Referential Example 6 while using 25 g of platinum in the place of the aqueous dinitrodiammineplatnum solution containing 3 g of platinum. This catalyst was found to have deposited on the carrier 25 g of platinum, 10 g of potassium, and 200 g of activated alumina per liter of the carrier.

REFERENTIAL EXAMPLE 25

A finished catalyst (25) was obtained by following the procedure of Referential Example 6 while using 40 g of platinum in the place of the aqueous dinitrodiammineplatnum solution containing 3 g of platinum. This catalyst was found to have deposited on the carrier 40 g of platinum, 10 g of potassium, and 200 g of activated alumina per liter of the carrier.

REFERENTIAL EXAMPLE 26

A finished catalyst (26) was obtained by following the procedure of Referential Example 6 while using a mixed solution of an aqueous dinitrodiammineplatinum solution containing 3 g of platinum and an aqueous palladium nitrate solution containing 2 g of palladium in the place of the aqueous dinitrodiammineplatnum solution containing 3 g of platinum. This catalyst was found to have deposited on the carrier 3 g of platinum, 2 g of palladium, 10 g of potassium, and 200 g of activated alumina per liter of the carrier.

REFERENTIAL EXAMPLE 27

A finished catalyst (27) was obtained by following the procedure of Referential Example 6 while using a mixed solution of an aqueous dinitrodiammineplatinum solution containing 3 g of platinum and an aqueous rhodium nitrate solution containing 0.3 g of rhodium in the place of the aqueous dinitrodiammineplatnum solution containing 3 g of platinum. This catalyst was found to have deposited on the carrier 3 g of platinum, 0.3 g of rhodium, 10 g of potassium, and 200 g of activated alumina per liter of the carrier.

REFERENTIAL EXAMPLE 28

A finished catalyst (28) was obtained by following the procedure of Referential Example 6 while using a mixed solution of an aqueous dinitrodiammineplatinum solution containing 3 g of platinum and an aqueous ruthenium nitrate solution containing 0.3 g of ruthenium in the place of the aqueous dinitrodiammineplatnum solution containing 3 g of platinum. This catalyst was found to have deposited on the carrier 3 g of platinum, 0.3 g of ruthenium, 10 g of potassium, and 200 g of activated alumina per liter of the carrier.

REFERENTIAL EXAMPLE 29

A finished catalyst (29) was obtained by following the procedure of Referential Example 6 while using a mixed solution of an aqueous palladium nitrate solution containing 5 g of palladium and an aqueous rhodium nitrate solution containing 0.3 g of rhodium in the place of the aqueous dinitrodiammineplatnum solution containing 3 g of platinum. This catalyst was found to have deposited on the carrier 5 g of palladium, 0.3 g of rhodium, 10 g of potassium, and 200 g of activated alumina per liter of the carrier.

REFERENTIAL EXAMPLE 30

A finished catalyst (30) was obtained by following the procedure of Referential Example 6 while using an aqueous solution containing potassium nitrate at a concentration of 0.13 mol/liter in the place of the aqueous solution containing potassium nitrate at a concentration of 2.6 mols/liter. This catalyst was found to have deposited on the carrier 3 g of platinum, 0.5 g of potassium, and 200 g of activated alumina per liter of the carrier.

REFERENTIAL EXAMPLE 31

A finished catalyst (31) was obtained by following the procedure of Referential Example 6 while using an aqueous solution containing potassium nitrate at a concentration of 0.52 mol/liter in the place of the aqueous solution containing potassium nitrate at a concentration of 2.6 mols/liter. This catalyst was found to have deposited on the carrier 3 g of platinum, 2 g of potassium, and 200 g of activated alumina per liter of the carrier.

REFERENTIAL EXAMPLE 32

A finished catalyst (32) was obtained by following the procedure of Referential Example 6 while using an aqueous solution containing potassium nitrate at a concentration of 18.2 mols/liter in the place of the aqueous solution containing potassium nitrate at a concentration of 2.6 mols/liter. This catalyst was found to have deposited on the carrier 3 g of platinum, 70 g of potassium, and 200 g of activated alumina per liter of the carrier.

REFERENTIAL EXAMPLE 33

A finished catalyst (33) was obtained by following the procedure of Referential Example 6 while using an aqueous solution containing potassium nitrate at a concentration of 23.4 mols/liter in the place of the aqueous solution containing potassium nitrate at a concentration of 2.6 mols/liter. This catalyst was found to have deposited on the carrier 3 g of platinum, 90 g of potassium, and 200 g of activated alumina per liter of the carrier.

REFERENTIAL EXAMPLE 34

A finished catalyst (34) was obtained by following the procedure of Referential Example 15 while using a mixed aqueous solution of cobalt nitrate containing 0.05 g of cobalt in the place of the aqueous solution of cobalt nitrate containing 2 g of cobalt. This catalyst was found to have deposited on the carrier 3 g of platinum, 0.05 g of cobalt, 10 g of sodium, and 200 g of activated alumina per liter of the carrier.

REFERENTIAL EXAMPLE 35

A finished catalyst (35) was obtained by following the procedure of Referential Example 15 while using a mixed aqueous solution of cobalt nitrate containing 0.2 g of cobalt in the place of the aqueous solution of cobalt nitrate containing 2 g of cobalt. This catalyst was found to have deposited on the carrier 3 g of platinum, 0.2 g of cobalt, 10 g of sodium, and 200 g of activated alumina per liter of the carrier.

REFERENTIAL EXAMPLE 36

A finished catalyst (36) was obtained by following the procedure of Referential Example 15 while using a mixed aqueous solution of cobalt nitrate containing 25 g of cobalt in the place of the aqueous solution of cobalt nitrate containing 2 g of cobalt. This catalyst was found to have deposited on the carrier 3 g of platinum, 25 g of cobalt, 10 g of sodium, and 200 g of activated alumina per liter of the carrier.

REFERENTIAL EXAMPLE 37

A finished catalyst (37) was obtained by following the procedure of Referential Example 15 while using a mixed aqueous solution of cobalt nitrate containing 40 g of cobalt in the place of the aqueous solution of cobalt nitrate containing 2 g of cobalt. This catalyst was found to have deposited on the carrier 3 g of platinum, 40 g of cobalt, 10 g of sodium, and 200 g of activated alumina per liter of the carrier.

REFERENTIAL EXAMPLE 38

A powder was obtained by mixing 100 g of the same activated alumina as used in Referential Example 1 with an aqueous dinitrodiammineplatinum solution containing 1 g of platinum, drying the resultant mixture at 120° C. for 2 hours, and calcining the dry mixture at 500° C. for 2 hours. An aqueous slurry was obtained by wet pulverizing the powder, 2 g of lanthanum oxide, and 2 g of iron oxide together in a ball mill. Thereafter, a finished catalyst (38) was obtained by following the procedure of Reference Example 20 while using the aqueous slurry instead. This finished catalyst was found to have deposited on the carrier 1 g of platinum, 2 g of lanthanum oxide, 2 g of iron oxide, and 100 g of activated alumina per liter of the carrier. Example 1

The catalysts obtained in Reference Example 1 to 37 were subjected to a test conforming to this invention (hereinafter referred to as "Test") as shown hereinbelow and to a test for comparison (hereinafter referred to as "Control").

A sample catalyst was packed in a stainless steel pipe 34.5 mm in diameter and 300 mm in length. A reaction gas of the following composition was introduced into the stainless steel pipe at a spatial velocity of 20,000/hr. Preparatory Test In preparation for the Test indicated below, the sample catalyst was analyzed to determine the capacity thereof for adsorption of nitrogen oxides. For the determination, an apparatus having chemical emission type nitrogen oxide analyzers (capable of determining the NO and $NO_2$ contents as the total $NO_x$ content) (omitted from illustration) connected one each via conduits 3 and 5 to the pipe at the points in front of and behind an enclosure for a catalyst bed 4 as illustrated in FIG. 1 was used. The enclosure for a catalyst bed 4 in the apparatus kept heated with an electric furnace 11 was filled with the sample catalyst. Then, a gas composed of 2.0% by volume of oxygen fed via a regulating valve 1b, 10% by volume of water fed via a regulating valve 7a, and the balance to make up 100% by volume of nitrogen fed via a regulating valve 1d was introduced at 400° C. into the apparatus. After the flow volume of this gas had stabilized, nitrogen monoxide (NO) was introduced into the apparatus so as to give the gas a nitrogen monoxide content of 500 ppm. In the course of this operation, the gas was analyzed continuously to determine the NO contents of the gas before and after the catalyst bed 4, with the determined NO contents accumulated to find the capacity of the catalyst for adsorption of nitrogen oxides. The results are shown in Table 1.

Then, with the inlet temperature of the catalyst bed kept at 400° C., the operation was continued under a varying set of conditions prescribed for a relevant test to find the average ratio of removal of $NO_x$ per hour.

Test 1

A reaction gas was formed by feeding 500 ppm of nitrogen monoxide (NO), 2.0% by volume of oxygen, 2,000 ppm of carbon monoxide, and the balance to make up 100% by volume of nitrogen respectively via regulating valves 1a, 1b, 1c, and 1d to a gas mixer 2. By the action of a liquid supply pump 8 and an evaporator 10, water was advanced via a liquid supply valve 7a at a ratio calculated to give the reaction gas a water content of 10% by volume and introduced into the catalyst bed 4. Propylene ($C_3H_6$) was fed for a duration of 10 seconds once per minute via a regulating valve 1e at a ratio calculated to give the reaction gas a propylene content of 3,000 ppm (as methane) and introduced into the reaction gas in the gas mixer 2. The reaction gas finally formed was supplied at a spatial velocity of 20,000 $hr^{-1}$ to the catalyst bed 4, with the inlet temperature of the catalyst kept at 400° C. with the electric furnace 11 to carry out Test 1. The exhaust gas emanating from the catalyst bed was discharged through a gas outlet 6. In the course of this operation, samples of the gas were extracted through the conduit 5 via a sampling valve 9b and introduced into the analyzer to determine the ratios of removal of $NO_x$. The results are shown in Table 1.

Test 2

This test was performed by following the procedure of Test 1 while adjusting the oxygen concentration at 0.4% by volume only during the introduction of the reducing agent and at 2.0% by volume during the absence of this introduction. The results are shown in Table 1.

Control 1

This control was performed by following the procedure of Test 1 while constantly adding propylene at a ratio of 1,000 ppm (as methane) instead of intermittently introducing propylene. The results are shown in Table 1.

Control 2

This control was performed by following the procedure of Test 1 while omitting the use of propylene. The results are shown in Table 1.

TABLE 1

| Catalyst | Amount of $NO_x$ adsorbed to saturation (m · mol/lit)*1 | Ratio of removal of $NO_x$ (%) | | | |
|---|---|---|---|---|---|
| | | Test 1 | Test 2 | Control 1 | Control 2 |
| 1 | 12 | 75 | 90 | 40 | 10 |
| 2 | 10 | 70 | 88 | 36 | 12 |
| 3 | 11 | 78 | 90 | 40 | 11 |
| 4 | 12 | 77 | 91 | 35 | 13 |
| 5 | 10 | 72 | 88 | 34 | 8 |
| 6 | 13 | 73 | 92 | 35 | 11 |
| 7 | 10 | 70 | 88 | 38 | 12 |
| 8 | 11 | 75 | 90 | 30 | 12 |
| 9 | 10 | 71 | 88 | 30 | 10 |
| 10 | 10 | 69 | 89 | 28 | 11 |
| 11 | 12 | 75 | 90 | 30 | 11 |
| 12 | 12 | 72 | 91 | 35 | 12 |
| 13 | 13 | 72 | 90 | 34 | 11 |
| 14 | 15 | 80 | 93 | 44 | 11 |
| 15 | 14 | 79 | 93 | 43 | 11 |
| 16 | 18 | 71 | 95 | 42 | 12 |
| 17 | 16 | 76 | 96 | 45 | 11 |
| 18 | 15 | 75 | 96 | 46 | 10 |
| 19 | 15 | 82 | 97 | 45 | 12 |
| 20 | 1 | 20 | 25 | 20 | 11 |
| 21 | 5 | 41 | 45 | 40 | 31 |
| 22 | 6 | 40 | 63 | 18 | 8 |
| 23 | 11 | 70 | 86 | 24 | 8 |
| 24 | 11 | 68 | 88 | 40 | 18 |
| 25 | 7 | 54 | 72 | 44 | 20 |
| 26 | 18 | 85 | 98 | 42 | 12 |
| 27 | 16 | 82 | 94 | 40 | 13 |
| 28 | 12 | 72 | 88 | 36 | 14 |
| 29 | 11 | 76 | 90 | 36 | 12 |
| 30 | 5 | 42 | 64 | 30 | 10 |
| 31 | 10 | 72 | 86 | 30 | 12 |
| 32 | 28 | 70 | 84 | 20 | 12 |
| 33 | 10 | 40 | 60 | 16 | 11 |
| 34 | 12 | 72 | 88 | 38 | 8 |
| 35 | 14 | 78 | 92 | 42 | 11 |
| 36 | 15 | 78 | 92 | 42 | 11 |
| 37 | 14 | 64 | 80 | 30 | 6 |

*1 Amount of nitrogen oxides adsorbed (m · mol) per liter of the catalyst.

Test 3

This test was performed by following the procedure of Test 2 while using the catalyst obtained in Referential Example 1 and varying the interval of introduction and the duration of introduction of propylene, the molar ratio of the amount of the reducing substance to the amount of $NO_x$ absorbed, and the kind of reducing substance. The results are shown in Tables 2 to 5.

TABLE 2

| | | | | |
|---|---|---|---|---|
| Interval of introduction of reducing substance (second) | 20 | 60 | 60 | 60 |
| Amount of $NO_x$ adsorbed (m · mol/lit) per liter of the catalyst*1 | 2.2 | 6.1 | 6.1 | 6.1 |
| Degree of saturation of adsorption (%)*2 | 17 | 48 | 48 | 48 |
| Reducing substance*3 | Pr | Pr | Pr | Pr |
| Concentration of reducing substance (ppmC$_1$) in the reaction gas | 3000 | 3000 | 1500 | 4500 |
| Duration of introduction of reducing substance (second) | 3 | 10 | 20 | 10 |
| Amount of reducing substance introduced (m · mol/liter) per liter of the catalyst*4 | 3.0 | 8.3 | 8.2 | 12.3 |
| Amount of reducing substance introduced/Amount of $NO_x$ adsorbed (molar ratio) | 1.4 | 1.3 | 1.3 | 2.0 |
| Ratio of removal of $NO_x$ (%) | 94 | 90 | 88 | 91 |

*1 Amount of $NO_x$ adsorbed in one process of introduction of reducing substance per liter of the catalyst.
*2 (Amount of nitrogen oxides adsorbed/amount of nitrogen oxides adsorbed by the catalyst to saturation) × 100 (%)
*3 Reducing substance - Pr: propylene (gas)
*4 Amount of reducing substance introduced in one process of introduction of reducing substance per liter of the catalyst.

TABLE 3

| | | | | | | | | |
|---|---|---|---|---|---|---|---|---|
| Interval of introduction of reducing substance (second) | 5 | 15 | 3000 | 4800 | 10 | 10 | 45 | 120 |
| Amount of $NO_x$ adsorbed (m · mol/lit) per liter of the catalyst*1 | 0.7 | 1.7 | 12 | 12 | 1.2 | 1.2 | 4.4 | 10.1 |
| Degree of saturation of adsorption (%)*2 | 6 | 13 | 100 | 100 | 10 | 10 | 37 | 81 |
| Reducing substance*3 | Pr | Pr | Pr | Pr | Pr | Pr | Pr | Pr |
| Concentration of reducing | 3000 | 3000 | 3000 | 3000 | 9000 | 9000 | 1500 | 1500 |

TABLE 3-continued

| substance (ppmC₁) in the reaction gas | | | | | | | | |
|---|---|---|---|---|---|---|---|---|
| Duration of introduction of reducing substance (second) | 1 | 3 | 20 | 20 | 0.05 | 0.5 | 15 | 30 |
| Amount of reducing substance introduced (m · mol/liter) per liter of the catalyst*⁴ | 0.8 | 2.4 | 16.5 | 16.5 | 0.12 | 1.2 | 6.2 | 12.3 |
| Amount of reducing substance introduced/Amount of NO$_x$ adsorbed (molar ratio) | 1.1 | 1.3 | 1.3 | 1.3 | 0.1 | 1.0 | 1.4 | 1.2 |
| Ratio of removal of NO$_x$ (%) | 40 | 88 | 50 | 32 | 18 | 88 | 71 | 42 |

*¹Amount of NO$_x$ adsorbed in one process of introduction of reducing substance per liter of the catalyst.
*²(Amount of nitrogen oxides adsorbed/amount of nitrogen oxides adsorbed by the catalyst to saturation) × 100 (%)
*³Reducing substance - Pr: propylene (gas)
*⁴Amount of reducing substance introduced in one process of introduction of reducing substance per liter of the catalyst.

TABLE 4

| Interval of introduction of reducing substance (second) | 60 | 60 | 240 | 360 |
|---|---|---|---|---|
| Amount of NO$_x$ adsorbed (m · mol/lit) per liter of the catalyst*¹ | 6.1 | 6.1 | 11.8 | 12 |
| Degree of saturation of adsorption (%)*² | 48 | 48 | 95 | 100 |
| Reducing substance*³ | Pr | Pr | Pr | Pr |
| Concentration of reducing substance (ppmC1) in the reaction gas | 3000 | 3000 | 9000 | 9000 |
| Duration of introduction of reducing substance (second) | 4 | 15 | 29 | 73 |
| Amount of reducing substance introduced (m · mol/liter) per liter of the catalyst*⁴ | 3.2 | 12.2 | 70.9 | 180 |
| Amount of reducing substance introduced/Amount of NO$_x$ adsorbed (molar ratio) | 0.5 | 2 | 6 | 15 |
| Ratio of removal of NO$_x$ (%) | 44 | 91 | 60 | 44 |

*¹Amount of NO$_x$ adsorbed in one process of introduction of reducing substance per liter of the catalyst.
*²(Amount of nitrogen oxides adsorbed/amount of nitrogen oxides adsorbed by the catalyst to saturation) × 100 (%)
*³Reducing substance - Pr: propylene (gas)
*⁴Amount of reducing substance introduced in one process of introduction of reducing substance per liter of the catalyst.

TABLE 5

| Interval of introduction of reducing substance (second) | 120 | 60 | 60 | 60 |
|---|---|---|---|---|
| Amount of NO$_x$ adsorbed (m · mol/lit) per liter of the catalyst*¹ | 10.1 | 6.1 | 6.1 | 6.1 |
| Degree of saturation of adsorption (%)*² | 81 | 48 | 48 | 48 |
| Reducing substance*³ | Pr | An | Et | Ur |
| Concentration of reducing substance (ppmC1) in the reaction gas | 3000 | 3000 | — | — |
| Duration of introduction of reducing substance (second) | 20 | 10 | — | — |
| Amount of reducing substance introduced (m · mol/liter) per liter of the catalyst*⁴ | 15.6 | 6.1 | 12.2 | 6.1 |
| Amount of reducing substance introduced/Amount of NO$_x$ adsorbed (molar ratio) | 1.5 | 1.0 | 2.0 | 1.0 |
| Ratio of removal of NO$_x$ (%) | 70 | 90 | 89 | 89 |

*¹Amount of NO$_x$ adsorbed in one process of introduction of reducing substance per liter of the catalyst.
*²(Amount of nitrogen oxides adsorbed/amount of nitrogen oxides adsorbed by the catalyst to saturation) × 100 (%)
*³Reducing substance - Pr: propylene (gas), An: Ammonia (ga), Et: Ethanol (introduced by spraying 0.56 g of liquid per liter of catalyst), Ur: Urea (introduced by spraying 0.46 g of aqueous 40 wt % solution per liter of catalyst), providing 1 mol of urea computed as 2 mols of ammonia.
*⁴Amount of reducing substance introduced in one process of introduction of reducing substance per liter of the catalyst.

EXAMPLE 2

The samples of the catalysts obtained in Referential Examples 6, 20, and 38 were disposed in varying orders indicated in Table 6 in the direction from the upstream to the downstream side of the flow of the exhaust gas and tested by following the procedure of Example 1. The results are shown in Table 6.

TABLE 6

| Cat. up-stream | Cat. mid-stream | Cat. down-stream | Amount of NO$_x$ adsorbed (m · mol/lit)*¹ | Ratio of removal of NO$_x$ (%) | | | |
|---|---|---|---|---|---|---|---|
| | | | | Test 1 | Test 2 | Control 1 | Control 2 |
| 6 | — | 20 | 14 | 86 | 99 | 44 | 13 |
| 20 | — | 6 | 13 | 85 | 98 | 42 | 12 |
| 6 | — | 6 | 26 | 75 | 94 | 37 | 11 |
| 20 | — | 20 | 1 | 22 | 26 | 22 | 12 |
| 6 | — | 38 | 19 | 86 | 99 | 44 | 13 |
| 38 | — | 6 | 18 | 85 | 98 | 42 | 13 |
| 20 | 6 | 20 | 16 | 88 | 99 | 44 | 14 |
| 38 | 6 | 38 | 22 | 88 | 99 | 44 | 14 |

*¹Amount of nitrogen monoxide adsorbed (m · mol) per liter of the catalyst.

INDUSTRIAL APPLICABILITY

This invention pertains to a method for the removal of nitrogen oxides from an exhaust gas characterized by causing the exhaust gas in an oxidizing atmosphere to contact a catalyst comprising a refractory inorganic oxide and catalytically active components, the components comprising 0.1 to 30 g as metal per liter of the catalyst of at least one noble metal selected from the group consisting of platinum, palladium, rhodium, and ruthenium or a compound of the noble metal and 1 to 80 g as metal per liter of the catalyst of at least one metal selected from the group consisting of lithium, potassium, sodium, rubidium, cesium, beryllium, magnesium, calcium, strontium, and barium or a compound of the metal, thereby inducing the catalyst to adsorb thereon the nitrogen oxides in the exhaust gas and, subsequently introducing a reducing substance intermittently into the exhaust gas thereby purifying the exhaust gas by reducing the nitrogen oxides adsorbed on the catalyst. It, therefore, permits efficient removal of $NO_x$ from an exhaust gas under treatment in an oxidizing atmosphere by means of oxidation and adsorption and then enables the $NO_x$ adsorbed on the catalyst to be efficiently removed therefrom by either intermittent introduction of a reducing agent to the catalyst or imparting a reducing atmosphere to the exhaust gas. Further, the method of this invention permits efficient disposal of $NO_x$ by use of a reducing agent only in a small amount without requiring any special device.

Besides, the catalytic system contemplated by this invention, when used in combination with an oxidizing catalyst and/or a three-way catalyst, produces the advantage of further exalting the efficiency of the removal of hydrocarbons and carbon monoxide.

We claim:

1. A method for the removal of nitrogen oxides from an exhaust gas characterized by causing said exhaust gas in an oxidizing atmosphere to contact a catalyst having a saturation capacity for adsorption of nitrogen oxides comprising a refractory inorganic oxide and catalytically active components, said components comprising 0.1 to 30 g as metal per liter of said catalyst of at least one noble metal selected from the group consisting of platinum, palladium, rhodium, and ruthenium or a compound of said noble metal and 1 to 80 g as metal per liter of said catalyst of at least one metal selected from the group consisting of lithium, potassium, rubidium, cesium, beryllium, magnesium, calcium, strontium, and barium or a compound of said metal, thereby inducing said catalyst to adsorb thereon the nitrogen oxides in said exhaust gas and, subsequently introducing a reducing substance intermittently in the range of 1 to 10 times in moles based on the amount of the nitrogen oxides adsorbed to the catalyst before adsorption of the nitrogen oxide reaches 90% of saturation capacity for adsorption, into said exhaust gas thereby purifying said exhaust gas by reducing said nitrogen oxides adsorbed on said catalyst, wherein the saturation capacity of said catalyst for adsorption of nitrogen oxides is in the range of 6 to 30 m.mols per liter of said catalyst;

wherein a gas containing 1 to 10 mols of said reducing substance per mol of said nitrogen oxides calculated as NO adsorbed on said catalyst is introduced for a duration in the range of 0.1 to 20 seconds at intervals in the range of 10 seconds to 60 minutes;

and wherein said exhaust gas is an exhaust gas from an internal combustion engine and the introduction of said reducing substance into said exhaust gas is effected by lowering the air-fuel ratio in the suction system of said internal combustion engine.

2. A method according to claim 1, wherein said catalyst further comprises 0.1 to 50 g per liter of said catalyst of at least one heavy metal selected from the group consisting of manganese, copper, cobalt, molybdenum, tungsten, and vanadium or a compound of said heavy metal.

3. A method according to claim 1, wherein said reducing substance is introduced before the amount of nitrogen oxides adsorbed by said catalyst totals 50% of the saturation capacity of said catalyst.

4. A method according to claim 1, wherein said reducing substance for introduction into said exhaust gas is obtained from an external source.

5. A method for the removal of nitrogen oxides from a flow of exhaust gas comprising the steps of installing in the flow of said exhaust gas a first catalyst, 50 to 400 g per liter of said first catalyst comprising a refractory inorganic oxide and catalytically active components, said components comprising 0.1 to 30 g as metal per liter of said first catalyst of at least one noble metal selected from the group consisting of platinum, palladium, rhodium, and ruthenium or a compound of said noble metal and 1 to 80 g as metal per liter of said catalyst of at least one metal selected from the group consisting of lithium, potassium, sodium, rubidium, cesium, beryllium, magnesium, calcium, strontium, and barium or a compound of said metal and, introducing a reducing substance intermittently in the range of 1 to 10 times in moles based-on the amount of the nitrogen oxides adsorbed to the catalyst before adsorption of the nitrogen oxide reaches to 90% of saturation capacity for adsorption into said exhaust as thereby purifying said exhaust gas by reducing said nitrogen oxides adsorbed on said catalyst, wherein the saturation capacity of said catalyst for adsorption of nitrogen oxides is in the range of 6 to 30 m.mols per liter of said catalyst.

wherein a gas containing 1 to 10 mols of said reducing substance per mol of said nitrogen oxides calculated as NO adsorbed on said catalyst is introduced for a duration in the range of 0.1 to 20 seconds at intervals in the range of 10 seconds to 60 minutes;

and wherein said exhaust gas is an exhaust gas from an internal combustion engine and the introduction of said reducing substance into said exhaust gas is effected by lowering the air-fuel ratio in the suction system of said internal combustion engine at the same time, installing a second, oxidizing catalyst or a three-way catalyst in the flow of said exhaust gas downstream from said first catalyst.

6. A method according to claim 5, wherein said second oxidizing catalyst comprises 0.1 to 10 g per liter of said second catalyst of platinum and/or palladium and 10 to 300 g per liter of said catalyst of a refractory oxide.

7. A method according to claim 6, wherein said second oxidizing catalyst further comprises 0.1 to 150 g per liter of said second catalyst of at least one oxide of an element selected from the group consisting of rare earth elements, nickel, cobalt, and iron.

8. A method for the removal of nitrogen oxides from an exhaust gas stream according to claim 5, wherein a three-way catalyst or oxidizing catalyst is disposed proximal to the source of said exhaust gas, the first catalyst set forth in claim 5 is disposed downstream from said three-way or oxidizing catalyst and a further three-way catalyst or oxidizing catalyst is disposed downstream of said first catalyst.

9. A method for the removal of nitrogen oxides from a flow of exhaust gas comprising the steps of installing in the flow of said exhaust gas a first catalyst, 50 to 400 g per liter of said first catalyst comprising a refractory inorganic oxide and catalytically active components, said components comprising 0.1 to 30 g as metal per liter of said catalyst of at least one noble metal selected from the group consisting of platinum, palladium, rhodium, and ruthenium or a compound of said noble metal, 1 to 80 g as metal per liter of said catalyst of at least one metal selected from the group consisting of lithium, potassium, sodium, rubidium, cesium, beryllium, magnesium, calcium, strontium, and barium or a compound of said metal, and 0.1 to 50 g per liter of said catalyst of at least one heavy metal selected from the group consisting of manganese, copper, cobalt, molybdenum, tungsten, and vanadium or a compound of said heavy metal and, introducing a reducing substance intermittently in the range of 1 to 10 times in moles based on the amount of the nitrogen oxides adsorbed to the catalyst before adsorption of the nitrogen oxide reaches to 90% of saturation capacity for adsorption, into said exhaust gas thereby purifying said exhaust gas by reducing said nitrogen oxides adsorbed on said catalyst, wherein the saturation capacity of said catalyst for adsorption of nitrogen oxides is in the range of 6 to 30 mols per liter of said catalyst:

wherein a gas containing 1 to 10 mols of said reducing substance per mol of said nitrogen oxides calculated has NO adsorbed on said catalyst is introduced for a duration in the range of 0.1 to 20 seconds at intervals in the range of 10 seconds to 60 minutes;

and wherein said exhaust has is an exhaust gas from an internal combustion engine and the introduction of said reducing substance into said exhaust gas is effected by lowering the air-fuel ratio in the suction system of said internal combustion engine.

at the same time, installing a second, oxidizing catalyst or a three-way catalyst in the flow of said exhaust gas downstream from said first catalyst.

10. A method according to claim 9, wherein said three-way catalyst comprises 10 to 300 g per liter of said first catalyst of a refractory inorganic oxide and catalytic components, said components comprising 0.1 to 10 g as metal per liter of said first catalyst of noble metals selected from the group consisting of (a) palladium, (b) platinum and rhodium, (c) palladium and rhodium, and (d) platinum, palladium, and rhodium, and 10 to 150 g as $CeO_2$ per liter of the catalyst of ceria.

11. A method according to claim 10, wherein said three-way catalyst further comprises 0.1 to 50 g as oxide per liter of said catalyst of at least one member selected from the group consisting of zirconia and rare earth elements except for cerium.

12. A method for the removal of nitrogen oxides from an exhaust gas stream according to claim 9, wherein a three-way catalyst or oxidizing catalyst is disposed proximal to the source of said exhaust gas, the first catalyst set forth in claim 9 is disposed downstream from said three-way or oxidizing catalyst and a further three-way catalyst or oxidizing catalyst is disposed downstream of said first catalyst.

13. A method according to claim 1, wherein said oxidizing catalyst comprises 0.1 to 10 g per liter of said catalyst of platinum and/or palladium and 10 to 300 g per liter of said catalyst of a refractory oxide.

14. A method according to claim 13, wherein said oxidizing catalyst further comprises 0.1 to 150 g per liter of said catalyst of at least one oxide of an element selected from the group consisting of rare earth elements, nickel, cobalt and iron.

15. A method according to claim 9, wherein said three-way catalyst comprises 10 to 300 g per liter of said catalyst of a refractory inorganic oxide and catalytic components, said components comprising 0.1 to 10 g as metal per liter of said catalyst of noble metal(s) selected from the group consisting of (a) palladium, (b) platinum and rhodium, (c) palladium and rhodium, and (d) platinum, palladium, and rhodium, and 10 to 150 as $CeO_2$ per liter of the catalyst of ceria.

16. A method according to claim 15, wherein said three-way catalyst further comprises 0.1 to 50 g as oxide per liter of said catalyst of at least one member selected from the group consisting of zirconia and rare earth elements except for cerium.

17. A method for the removal of nitrogen oxides from an exhaust gas characterized by causing said exhaust gas in an oxidizing atmosphere to contact a catalyst having a saturation capacity for adsorption of nitrogen oxides comprising a refractory inorganic oxide and catalytically active components, said components comprising 0.1 to 30 g as metal per liter of said catalyst of at least one noble metal selected from the group consisting of platinum, palladium, rhodium, and ruthenium or a compound of said noble metal and 1 to 80 g as metal per liter of said catalyst of at least one metal selected from the group consisting of lithium, potassium sodium, rubidium, cesium, beryllium, magnesium, calcium, strontium, and barium or a compound of said metal, thereby inducing said catalyst to adsorb thereon the nitrogen oxides in said exhaust gas and, subsequently introducing a reducing substance intermittently in the range of 1 to 10 times in moles based on the amount of the nitrogen oxides adsorbed to the catalyst before adsorption of the nitrogen oxide reaches to 90% of saturation capacity for adsorption, into said exhaust gas thereby purifying said exhaust gas by reducing said nitrogen oxides adsorbed on said catalyst, wherein the saturation capacity of said catalyst for adsorption of nitrogen oxides is in the range of 6 to 30 m.mols per liter of said catalyst;

wherein a gas containing 1 to 10 mols of said reducing substance per mol of said nitrogen oxides calculated as NO adsorbed on said catalyst is introduced for a duration in the range of 0.1 to 20 seconds at intervals in the range of 10 seconds to 60 minutes;

and wherein said exhaust gas is an exhaust gas from an internal combustion engine and the introduction of said reducing substance into said exhaust gas is effected by setting the air to fuel ratio in the suction system of the internal combustion engine at a theoretical or an air-rich level.

* * * * *